United States Patent
Guo

(10) Patent No.: US 8,852,524 B2
(45) Date of Patent: Oct. 7, 2014

(54) CELL COUNTING SLIDE WITH LATERAL RESERVOIR FOR PROMOTING UNIFORM CELL DISTRIBUTION

(75) Inventor: Kun Guo, Pinole, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 519 days.

(21) Appl. No.: 12/986,696

(22) Filed: Jan. 7, 2011

(65) Prior Publication Data

US 2012/0015392 A1 Jan. 19, 2012

Related U.S. Application Data

(60) Provisional application No. 61/294,373, filed on Jan. 12, 2010.

(51) Int. Cl.
| | | |
|---|---|---|
| *B01D 1/00* | (2006.01) | |
| *B01D 3/00* | (2006.01) | |
| *B01D 17/00* | (2006.01) | |
| *G01N 33/00* | (2006.01) | |
| *C12M 1/34* | (2006.01) | |
| *C12M 3/00* | (2006.01) | |
| *G02B 21/34* | (2006.01) | |
| *G01N 35/00* | (2006.01) | |
| *B01L 3/00* | (2006.01) | |
| *B01L 99/00* | (2010.01) | |

(52) U.S. Cl.
CPC ............. *G02B 21/34* (2013.01); *Y10S 435/97* (2013.01)
USPC .......... 422/500; 435/288.3; 435/970; 436/46; 422/73

(58) Field of Classification Search
CPC combination set(s) only.
See application file for complete search history.

(56) References Cited

U.S. PATENT DOCUMENTS

| | | | |
|---|---|---|---|
| 4,171,866 A | 10/1979 | Tolles | |
| 5,306,467 A | 4/1994 | Douglas-Hamilton et al. | |
| 5,349,436 A | 9/1994 | Fisch | |
| 6,165,739 A | 12/2000 | Clatch | |
| 2004/0180397 A1* | 9/2004 | Chang | 435/40.5 |
| 2006/0275743 A1* | 12/2006 | Simmet | 435/4 |
| 2010/0328766 A1 | 12/2010 | Griffin et al. | |
| 2011/0211058 A1 | 9/2011 | McCollum et al. | |
| 2012/0013727 A1 | 1/2012 | Breniman et al. | |
| 2012/0295300 A1 | 11/2012 | Heng et al. | |
| 2012/0314092 A1 | 12/2012 | Chu et al. | |

FOREIGN PATENT DOCUMENTS

| | | |
|---|---|---|
| GB | 2 127 557 A | 4/1984 |
| JP | S63-105715 | 5/1988 |
| JP | H09-236756 A | 9/1997 |

OTHER PUBLICATIONS

Office Action from JP Appl. No. 2012-548990, dated Aug. 19, 2013 (with English Translation).
The Supplementary European Search Report from EP 11733236.1, mailed Oct. 25, 2013.

* cited by examiner

*Primary Examiner* — Jill Warden
*Assistant Examiner* — Julie Tavares
(74) *Attorney, Agent, or Firm* — Kilpatrick Townsend & Stockton LLP

(57) ABSTRACT

Cells in a suspension are counted in a hemocytometer slice with a chamber of controlled depth and one or more reservoirs along one or more side edges of the chamber. The suspension is fed to a reservoir to first fill the reservoir, and then to overflow into the chamber. The result is an even distribution of the cells in the chamber.

15 Claims, 3 Drawing Sheets

CELL COUNTING SLIDE WITH LATERAL RESERVOIR FOR PROMOTING UNIFORM CELL DISTRIBUTION

CROSS-REFERENCES TO RELATED APPLICATIONS

This application claims the benefit of U.S. Provisional Patent Application No. 61/294,373, filed Jan. 12, 2010, the contents of which are incorporated herein by reference.

BACKGROUND OF THE INVENTION

1. Field of the Invention

This invention resides in the field of laboratory apparatus for biological and biochemical laboratories, and particularly to apparatus for cell counting.

2. Description of the Prior Art

Cell counting in suspensions of blood cells, bacteria, and biological cells in general is a procedure commonly used in clinical and research laboratories. Measurement of the number of cells per unit volume of the suspension by cell counting is valuable in assessing such qualities as biological function and activity as well as cell viability and growth. Cell counting is commonly performed on a hemocytometer, which utilizes a microscope slide to hold the suspension and a microscopic viewer to allow viewer observation of the slide for manual counting, either directly or from an image of the slide. To count cells in a suspension, a drop of the suspension is placed in the slide and covered by a second slide or any thin transparent cover slip. The gap (also referred to as the "chamber") between the slide and the cover slip is typically on the order of 100 microns. A grid on the underside of the cover slip delineates an area for counting, and knowledge of both the area and the depth of the gap allows the viewer to determine the cell count per unit volume. The grid enables the viewer to select a portion of the grid whose area is small relative to the dimensions of the slide, thereby enabling the user to count cells with relative ease and quickness and with minimal risk of error. A critical feature of the slide and cover slip combination is therefore the distance between them, and another is the evenness of the distribution of the cells across the width of the slide. If the distance is not uniform or the cells are not distributed evenly, the concentration calculated from the selected area can differ from the concentration in the suspension as a whole.

Conventional means of placing the suspension in the chamber of a cell counting slide involve the use of a pipette to introduce the suspension to one side of the chamber through a notch or similar opening in the cover sheet. The suspension then flows from the notch into the chamber. Examples of disclosures of slides of this type and their use are found in Tolles, W., U.S. Pat. No. 4,171,866, issued Oct. 23, 1979, and Fisch, H., U.S. Pat. No. 5,349,436, issued Sep. 20, 1994. The result of this procedure however is often an uneven distribution of the cells, with the concentration being relatively high in areas to the sides of the notch than in areas near the center of the notch due to differences in the flow direction and flow rate of the suspension at different points within the chamber. The concentration of cells at the center of the chamber, which is typically where the counting takes place, is therefore different (most often lower) than the concentration of the suspension as a whole. The present invention addresses this problem.

SUMMARY OF THE INVENTION

The present invention resides in a cell counting slide that contains a counting chamber and one or more reservoirs along the periphery of the counting chamber. The counting chamber is also referred to herein as a cell counting section, and it and the reservoir(s) together form a cavity in the interior of the cell counting slide. The slide in many cases is a combination of two plates, one forming the base and the other taking the place of the cover slip in conventional cell counting slides. The two plates can be individual components that are stacked together for use, or they can be fused together for sale, shipment, or use as a unit. Alternatively, they can be formed (cast or machined) as a single (unitary) piece of material. In all cases, the depth (or height) of the cell counting section, which defines the depth of the cell suspension during counting, is set by the floor and ceiling of the section, which are two opposing and parallel flat surfaces. The upper plate is transparent to allow counting from above, and in many embodiments, the entire slide is transparent.

The reservoir preferably extends the full length of a side of the chamber. In many cases, the chamber is rectangular in shape and the reservoir extends the full length of one of the shorter (lateral) sides of the rectangle, and in many of these cases, two reservoirs are included, one on each of two opposing sides of the rectangle. In either case, the reservoir extends below the floor of the cell counting section and is deeper than the gap between the floor and ceiling of the cell counting section, preferably by a factor of at least two. The suspension can be fed to the reservoir through a port in the upper plate of the slide, such as by a pipette. When a suspension is added in this manner, the reservoir fills with the suspension before the suspension enters the counting chamber. Only after the reservoir is filled does the suspension enter the cell counting section, and when the reservoir extends the full length of one side the passage of the cells into the cell counting section occurs substantially evenly along the length of that side.

The depths of both the counting chamber and the reservoir(s) can vary. For a cell counting section that is 100 microns in depth, for example, best results in, most cases will be obtained with a reservoir that is 300 microns to 1 milliliter (1,000 microns), or most preferably about 500 microns, in depth. The reservoir does not require a uniform depth. For a rectangular counting area, reservoirs extending the lengths of each of two opposing sides of the rectangle are useful, allowing the user a choice between the two reservoirs. The suspension can be added through a single reservoir, using the opposing reservoir as a vent for air to escape from the cell counting section.

DESCRIPTION OF ILLUSTRATIVE EMBODIMENTS

The drawings attached hereto represent illustrative embodiments of the invention. In each of these embodiments, the slide is constructed as two plates, a top plate and a bottom plate.

Figure 1:
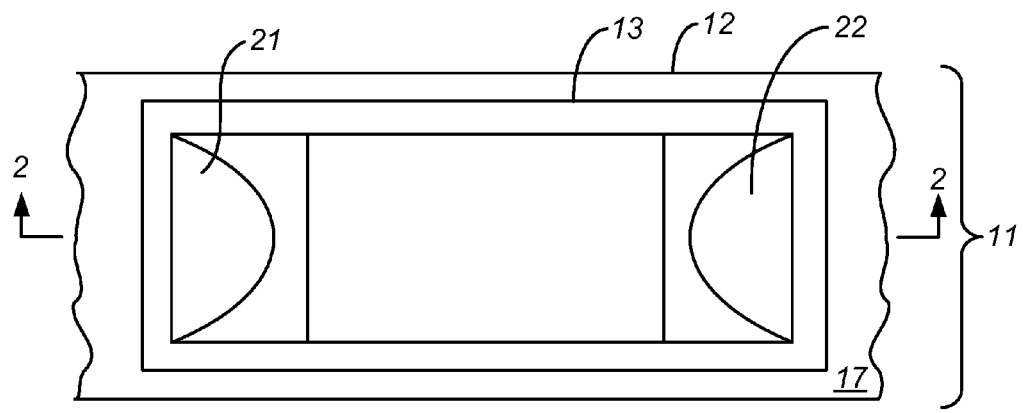
FIG. 1 is a top view of one embodiment of the present invention.
Figure 2:
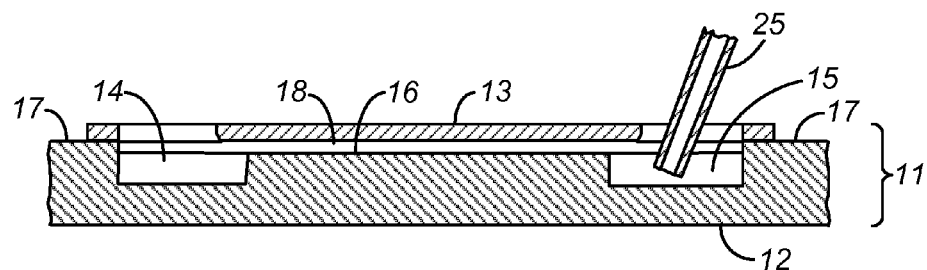
FIG. 2 is a cross section of the embodiment of FIG. 1, taken along the line 2-2 of FIG. 1.
Figure 3:
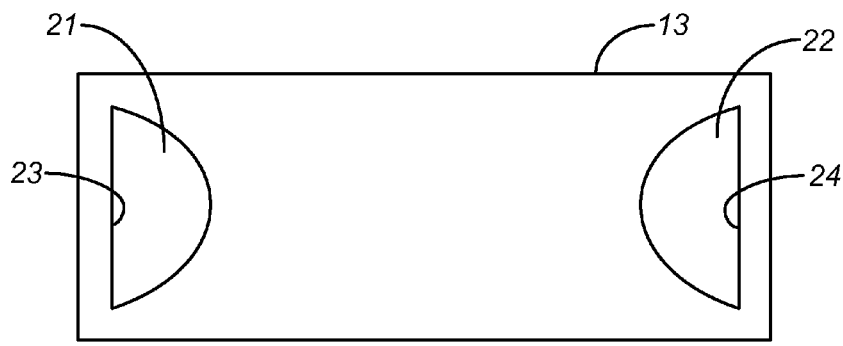
FIG. 3 is a copy view of the upper part of the embodiment of FIG. 1.

One embodiment is depicted in a top view of the stacked plates in FIG. 1, a vertical cross section of the stacked plates in FIG. 2 taken along the line 2-2 of FIG. 1, and a top view of the top plate in FIG. 3. Of the stacked plates 11, the bottom plate 12 serves as the floor of the cell counting section and the floors of the reservoirs, and the top plate 13 serves as the ceiling of the cell counting section. Cell counting is performed by taking an image of the cells in the cell counting section by direct visual observation through the top plate. As mentioned above, the top plate 13 is transparent, and in preferred embodiments, both top and bottom plates 12, 13 are transparent.

As seen in the cross section of FIG. 2, the bottom plate 12 is a plate with two parallel recessed rectangular sections 14, 15 separated by a platform 16 that forms the floor of the cell counting section. The height of the platform 16 is less than that of the periphery 17 of the plate surrounding the two recessed rectangular sections 14, 15 and the platform. The top plate 13 extends over and rests on the periphery 17 of the bottom plate, leaving a gap 18 between the platform 16 and the central portion of the upper part 13. The recessed rectangular sections 14, thus form the reservoirs, and the gap 18 forms the cell counting section, the reservoirs and the cell counting section together constituting the cavity of the slide. The top plate 13, shown separately in a top view in FIG. 3, is a flat plate that is continuous except for two openings 21, 22 (FIG. 1) that are generally U-shaped with outer edges 23, 24 aligned with the outer edges of the two reservoirs 14, 15 in the lower plate 12. These openings thus serve as ports for loading the slide. In use, the cell suspension is applied by pipette 25 through one of the ports 22 to the underlying reservoir 15 to first fill the reservoir. Once the reservoir is filled, further suspension is supplied through the pipette and suspension from the reservoir flows over into the cell counting section 18.

In an alternative structure, the platform 16 can be at the same height as the periphery 17 of the bottom plate 12, while the central section of the top plate 13 above the platform can be thinner than the remainder of the top plate, thereby forming a gap of the same width as in the structure shown in FIGS. 1, 2, and 3.

Figure 4:
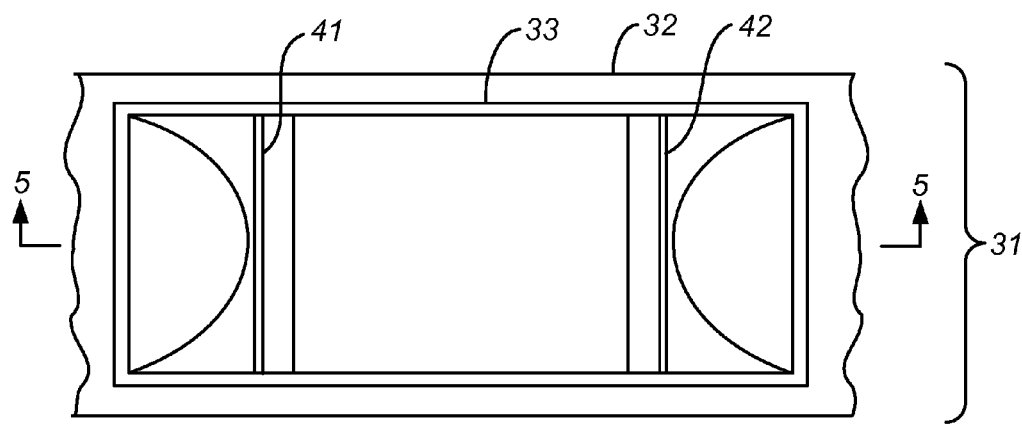
FIG. 4 is a top view of a second embodiment of the present invention.
Figure 5:
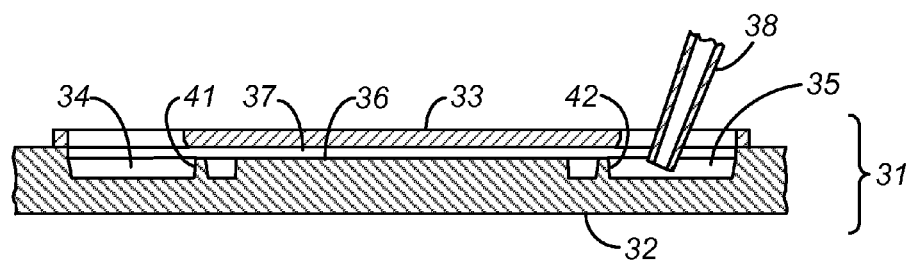
FIG. 5 is a cross section of the embodiment of FIG. 4, taken along the line 5-5 of FIG. 4.

A second embodiment is shown in a top view in FIG. 4, and in a vertical cross section in FIG. 5 taken along the line 5-5 of FIG. 4. Here again, the slide 31 is shown in two parts—a bottom plate 32 which serves as the floors of both the chamber (i.e., the cell counting section) and the reservoirs, and a top plate 33 which serves as the ceiling of the chamber and through which counting is performed. Like the slide of FIGS. 1, 2, and 3, the slide 31 of FIGS. 4 and 5 contains two reservoirs 34, 35 with a platform 36 between them and a gap 37 between the platform 36 and the top plate 33 to serve as the chamber for cell counting. A pipette 38 is shown for use in the same manner as the pipette of FIG. 2. The added feature in the embodiment of FIGS. 4 and 5 is a pair of dams 41, 42, one dam within each of the reservoirs 34, 35 along and parallel to the side of the reservoir closest to the platform, and extending the length of the reservoir. The dams 41, 42 serve to slow down the flow of the suspension toward the platform and improve the distribution of the suspension along the edges of the platform before passing over the edges into the cell counting section of the slide cavity. The dam thus produces a more even distribution of the cells in the cell counting area. For still greater control, a single reservoir can contain two or more dams, for example extending parallel to the edge of the platform 36.

Figure 6:
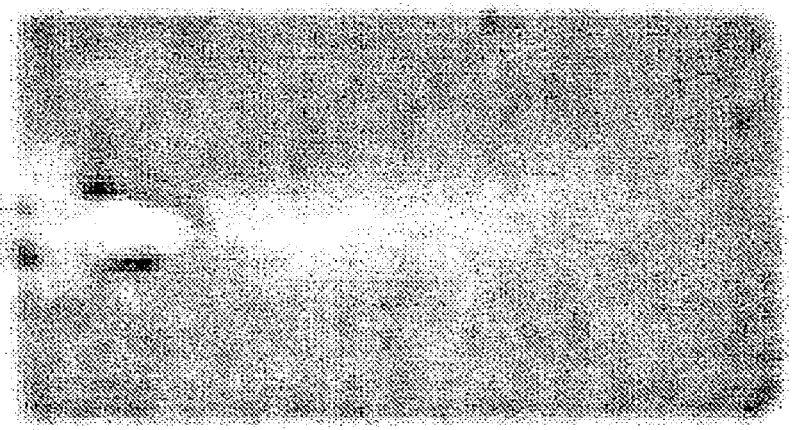
FIG. 6 is an image of cells in a cell counting slide of the prior art.
Figure 7:
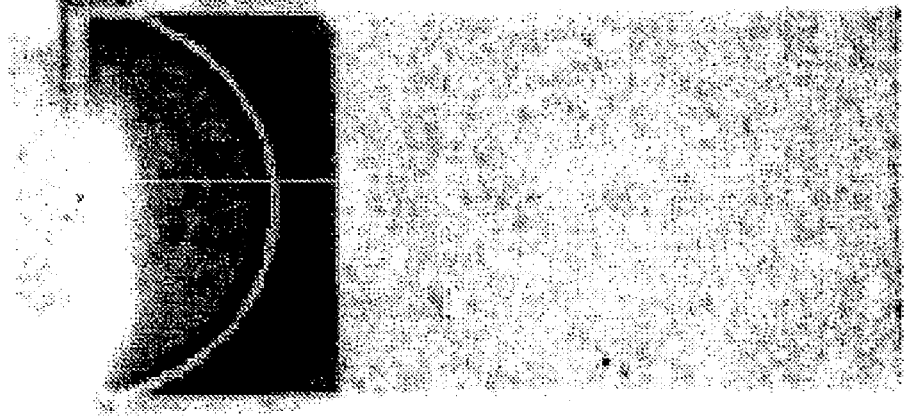
FIG. 7 is an image of cells in a cell counting slide of the present invention.

A comparison of cell distributions in slides of the present invention vs. those of the prior art (lacking the reservoirs) is seen in FIG. 6 representing the prior art (lacking the reservoirs and the dams) and 7 representing the present invention (containing both the reservoirs and the dams). The images show that the cell slide of the prior art (FIG. 6) has a lower concentration of cells at the center of the chamber, which thus appears lighter in contrast, while the cell slide of the invention (FIG. 7) has an even distribution of cells across the length and width of the slide.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein or any prior art in general and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A cell counting slide comprising:
  a) a substantially flat enclosure with a cavity therein, said cavity comprising:
    (i) a cell counting section bounded by a planar floor and a transparent planar ceiling parallel to said floor and separated from said floor by a gap that accommodates a cell suspension and is sufficiently shallow to permit individual observation of all cells therein through said ceiling; and
    (ii) a reservoir extending the length of an edge of said cell counting section and having a depth substantially exceeding said gap, said reservoir extending below said planar floor and open to said cell counting section along said entire length;
  (b) a port in said ceiling opening into said reservoir; and
  (c) a dam within said reservoir arranged to slow down flow of a cell suspension from said reservoir to said cell counting section,
  wherein said reservoir has a reservoir floor and said dam is a ridge in said reservoir floor parallel to said edge of said cell counting section,
  such that a segment of said reservoir floor separates said dam from said edge of said cell counting section, and said dam extends above said segment of said reservoir floor.

2. The cell counting slide of claim 1 wherein said cavity comprises first and second said reservoirs extending along the lengths of opposing edges of said cell counting section, the first reservoir having a first reservoir floor and the second reservoir having a second reservoir floor, and said cell counting slide comprises first and second said ports, one said port opening into each said reservoir.

3. The cell counting slide of claim 1 wherein said gap has a height and said reservoir has a depth at least twice said height.

4. The cell counting slide of claim 1 wherein said cell counting section is rectangular with two longitudinal edges and two lateral edges each shorter than said longitudinal edges, and said reservoir extends the length of one of said lateral edges.

5. The cell counting slide of claim 2 wherein said cell counting section is rectangular with two longitudinal edges and two lateral edges each shorter than said longitudinal edges, with one said reservoir extending the length of each of said lateral edges.

6. The cell counting slide of claim 1 wherein said enclosure consists of upper and lower plates, said upper plate forming said ceiling and said tower plate forming said floor and said reservoir when said plates are stacked.

7. The cell counting slide of claim 2 further comprising a first dam within said first reservoir and a second dam within said second reservoir, each said dam arranged parallel to one of said opposing edges of said cell counting section, such that the first dam is a ridge in the first reservoir floor separated from one edge of said cell counting section by a segment of the first reservoir floor, the first dam extending above the segment of the first reservoir floor, and the second dam is a ridge in the second reservoir floor separated from the opposite edge of said cell counting section by a segment of the second reservoir floor, the second darn extending above the segment of the second reservoir floor.

8. The cell counting slide of claim 1, wherein the depth of said reservoir is uniform.

9. The cell counting slide of claim 1, further comprising a second dam within said reservoir.

10. The cell counting slide of claim 1, wherein the top of said dam is separated from said transparent planar ceiling by a distance about equal to the height of said gap, 11. The cell counting slide of claim 2, wherein the depth of the first reservoir is about equal to the depth of the second reservoir.

12. A method for counting cells in a cell suspension, said method comprising:
  (a) placing said suspension in the cell counting slide of claim 1 by feeding said suspension to said reservoir through said port to fill said reservoir and to cause said suspension to overflow from said reservoir over said darn into said cell counting section; and
  (b) examining said cell counting, section through said transparent planar ceiling to count cells in at least a portion of said cell counting section.

13. The method of claim 12 wherein:
  said cavity comprises first and second said reservoirs extending along the lengths of opposing edges of said cell counting section, said dam within the first reservoir;
  said cell counting slide comprises first and second said ports, one said port opening into each said reservoir; and
  step (a) comprises feeding said suspension to said first reservoir through said first port while venting air from said cavity through said second port.

14. The method of claim 12 wherein said cell counting section is rectangular with two longitudinal edges and two lateral edges each shorter than said longitudinal edges, and said reservoir extends the length of one of said lateral edges.

15. The method of claim 13 wherein said cell counting section is rectangular with two longitudinal edges and two lateral edges each shorter than said longitudinal edges, said first reservoir extends the length of one of said lateral edges, and second reservoir extends the length of the other of said lateral edges.

* * * * *